(12) United States Patent
Chen et al.

(10) Patent No.: US 9,990,068 B2
(45) Date of Patent: Jun. 5, 2018

(54) COLOR FILTER SUBSTRATE, FABRICATING METHOD OF COLOR FILTER SUBSTRATE, TOUCH SCREEN AND DISPLAY DEVICE

(71) Applicants: BOE TECHNOLOGY GROUP CO., LTD., Beijing (CN); Chongqing BOE Optoelectronics Technology Co., Ltd., Chongqing (CN)

(72) Inventors: Qichao Chen, Beijing (CN); Yong Wang, Beijing (CN); Wei Zhang, Beijing (CN); Cheng Gu, Beijing (CN); Junhua Niu, Beijing (CN); Zhengcai Liu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 126 days.

(21) Appl. No.: 14/913,096

(22) PCT Filed: Aug. 17, 2015

(86) PCT No.: PCT/CN2015/087257
§ 371 (c)(1),
(2) Date: Feb. 19, 2016

(87) PCT Pub. No.: WO2016/173153
PCT Pub. Date: Nov. 3, 2016

(65) Prior Publication Data
US 2017/0060309 A1 Mar. 2, 2017

(30) Foreign Application Priority Data
Apr. 29, 2015 (CN) .......................... 2015 1 0214002

(51) Int. Cl.
G06F 3/041 (2006.01)
G02F 1/1335 (2006.01)
(Continued)

(52) U.S. Cl.
CPC .......... *G06F 3/0412* (2013.01); *G02F 1/1335* (2013.01); *G02F 1/13338* (2013.01);
(Continued)

(58) Field of Classification Search
None
See application file for complete search history.

(56) References Cited

U.S. PATENT DOCUMENTS

2006/0256093 A1 11/2006 Furukawa et al.
2010/0214247 A1 8/2010 Tang et al.
(Continued)

FOREIGN PATENT DOCUMENTS

CN 101963713 A 2/2011
CN 102929031 A 2/2013
(Continued)

OTHER PUBLICATIONS

Office Action dated May 10, 2017 issued in corresponding Chinese Application No. 201510214002.5.
(Continued)

*Primary Examiner* — Gustavo Polo
(74) *Attorney, Agent, or Firm* — Nath, Goldberg & Meyer; Joshua B. Goldberg

(57) ABSTRACT

The invention discloses a color filter substrate, a method for fabricating the color filter substrate, a touch screen and a display device. The color filter substrate comprises: a transparent substrate; a color filter layer provided on one side of the transparent substrate; a first touch electrode provided on the side of the transparent substrate where the color filter layer is located, the first touch electrode being made of metal
(Continued)

or ashed metal; and a second touch electrode provided on one side of the transparent substrate. The embodiments of the invention solve the problems that a touch screen with touch electrodes made of ITO has high impedance, large thickness and high cost, thus lowering the impedance of the touch screen, reducing the thickness of the touch screen and lowering the cost.

15 Claims, 5 Drawing Sheets

(51) Int. Cl.
    *G02F 1/1333*     (2006.01)
    *G02F 1/1343*     (2006.01)
    *G06F 3/044*     (2006.01)

(52) U.S. Cl.
    CPC .... *G02F 1/13439* (2013.01); *G02F 1/133512* (2013.01); *G02F 1/133514* (2013.01); *G02F 1/134309* (2013.01); *G06F 3/044* (2013.01); *G06F 2203/04103* (2013.01); *G06F 2203/04112* (2013.01)

(56) References Cited

U.S. PATENT DOCUMENTS

2016/0342259 A1    11/2016    Xiong et al.
2016/0357047 A1    12/2016    Yu et al.

FOREIGN PATENT DOCUMENTS

| | | |
|---|---|---|
| CN | 103278955 A | 9/2013 |
| CN | 104216596 A | 12/2014 |
| CN | 104375707 A | 2/2015 |
| CN | 104516611 A | 4/2015 |
| JP | 2013-97704 A | 5/2013 |
| JP | 201397704 A | 5/2013 |

OTHER PUBLICATIONS

ISR issued in International application No. PCT/CN2015/087257 dated Aug. 17, 2015.
The Second Office Action dated Jan. 17, 2018 corresponding to Chinese application No. 201510214002.5.

COLOR FILTER SUBSTRATE, FABRICATING METHOD OF COLOR FILTER SUBSTRATE, TOUCH SCREEN AND DISPLAY DEVICE

This is a National Phase Application filed under 35 U.S.C. 371 as a national stage of PCT/CN2015/087257, filed Aug. 17, 2015, an application claiming the benefit of Chinese Application No. 201510214002.5, filed Apr. 29, 2015, the content of each of which is hereby incorporated by reference in its entirety.

FIELD OF THE INVENTION

The present invention relates to the field of touch screen technology, and particularly relates to a color filter substrate, a fabricating method of the color filter substrate, a touch screen and a display device.

BACKGROUND OF THE INVENTION

The touch screen technology is an intelligent human-machine interactive input technology, and the touch screen input is more intuitive than the traditional keyboard and mouse input mode. Currently, touch screens are mainly required by the consumer electronics industry, particularly by mobile phones, portable game machines, personal digital assistants, portable navigation equipment, etc. Touch screens are diverse, and the capacitive embedded touch screen is one of the most common types.

In the prior art, the capacitive embedded touch screen works mainly by means of human current induction, and touch electrodes are generally fabricated on two sides of a color filter (referred to as CF) by adopting two layers of indium tin oxide (referred to as ITO) in the color filter substrate of the capacitive embedded touch screen. Specifically, as shown in FIG. 1, the capacitive embedded touch screen includes a back light source 1001, a polarizer 1002, an bottom glass substrate 1003, a thin film field effect transistor 1004, a liquid crystal layer 1005, a first ITO touch electrode 1006, a CF 1007, a top glass substrate 1008, a second ITO touch electrode 1009, a polarizer or cover plate 1010 and the like in sequence from bottom to top. When a finger touches the capacitive embedded touch screen, a coupling capacitor is formed between the user and the surface of the capacitive embedded touch screen due to human electric field, the capacitor is a direct conductor with respect to high-frequency current, and the finger draws tiny current away from the contact point. The current flows out through the touch electrodes, and the main controller of the touch screen accurately calculates the position information of the touch point according to the outflow current.

However, the ITO forming the touch electrodes in the color filter substrate of the capacitive embedded touch screen has high impedance, poor toughness and expensive cost, thus the touch screen with the touch electrodes made of the ITO has high impedance, large thickness and high cost.

SUMMARY OF THE INVENTION

In order to solve the problems that a touch screen with touch electrodes made of ITO has high impedance, large thickness and high cost, the embodiments of the present invention provide a color filter substrate, a fabricating method of the color filter substrate, a touch screen and a display device.

An embodiment of the present invention provides a color filter substrate, including: a transparent substrate; a color filter layer provided on one side of the transparent substrate; a first touch electrode provided on the side, where the color filter layer is located, of the transparent substrate, the first touch electrode being made of metal or ashed metal; and a second touch electrode provided on one side of the transparent substrate.

The second touch electrode and the first touch electrode may be provided on different sides of the transparent substrate.

The second touch electrode may be made of ashed metal.

The color filter layer may include color pixels and a black matrix between the adjacent color pixels, and a projection of the first touch electrode on the transparent substrate is positioned within a projection region of the black matrix on the transparent substrate.

The color filter layer may include color pixels and a black matrix between the adjacent color pixels, and the first touch electrode is provided on a surface of one side of the black matrix away from the transparent substrate.

The color filter layer may include color pixels and a black matrix between the adjacent color pixels, and the first touch electrode is provided between the transparent substrate and the black matrix.

The color filter layer may include color pixels and a black matrix between the adjacent color pixels, and a projection of the second touch electrode on the transparent substrate is positioned within a projection region of the black matrix on the transparent substrate.

The metal may include at least one of copper, molybdenum, aluminum and silver. The ashed metal may be molybdenum niobium oxynitride.

The color filter substrate may further include a shadow elimination layer, which is provided on a surface of one side of the second touch electrode away from the transparent substrate.

Another embodiment of the present invention provides a fabricating method of the color filter substrate, including steps of: forming a color filter layer on one side of a transparent substrate; forming a first touch electrode on the side, where the color filter layer is located, of the transparent substrate, the first touch electrode being made of metal or ashed metal; and forming a second touch electrode on one side of the transparent substrate.

The step of forming a second touch electrode on one side of the transparent substrate may include: forming a second touch electrode so that the second touch electrode and the first touch electrode are provided on different sides of the transparent substrate.

The second touch electrode may be made of ashed metal.

The color filter layer may include color pixels and a black matrix between the adjacent color pixels, and the step of forming a first touch electrode on the side, where the color filter layer is located, of the transparent substrate may include: forming a first touch electrode so that a projection of the first touch electrode on the transparent substrate is positioned within a projection region of the black matrix on the transparent substrate.

The color filter layer may include color pixels and a black matrix between the adjacent color pixels, and the step of forming a first touch electrode on the side, where the color filter layer is located, of the transparent substrate may include: forming a first touch electrode so that the first touch electrode is provided on a surface of one side of the black matrix away from the transparent substrate.

The color filter layer may include color pixels and a black matrix between the adjacent color pixels, and the step of forming a first touch electrode on the side, where the color filter layer is located, of the transparent substrate may include: forming a first touch electrode so that the first touch electrode is provided between the transparent substrate and the black matrix.

The color filter layer may include color pixels and a black matrix between the adjacent color pixels, and the step of forming a second touch electrode on one side of the transparent substrate may include: forming a second touch electrode so that a projection of the second touch electrode on the transparent substrate is positioned within a projection region of the black matrix on the transparent substrate.

The metal may include at least one of copper, molybdenum, aluminum and silver. The ashed metal may be molybdenum niobium oxynitride.

After the second touch electrode is formed on one side of the transparent substrate, the method may further include: forming a shadow elimination layer on a surface of one side of the second touch electrode away from the transparent substrate.

A further embodiment of the present invention provides a touch screen, including the abovementioned color filter substrate.

A still further embodiment of the present invention provides a display device, including the abovementioned touch screen.

In the color filter substrate, the fabricating method of the color filter substrate, the touch screen and the display device provided by the present invention, the color filter layer is provided on one side of the transparent substrate, the first touch electrode is formed on the side, where the color filter layer is located, of the transparent substrate, the first touch electrode is made of metal or ashed metal, and the second touch electrode is formed on one side of the transparent substrate. The first touch electrode in the color filter substrate is made of metal or ashed metal, so that the impendence of the touch screen is lowered, the size of the touch screen is reduced and the cost is lowered.

It should be understood that, the above general description and following detailed description are merely exemplary and interpretive, rather than limiting the present invention.

BRIEF DESCRIPTION OF THE DRAWINGS

To illustrate the technical solutions in the embodiments of the present invention more clearly, a brief introduction on the accompanying drawings which are needed for use in the description of the embodiments is given below. Apparently, the accompanying drawings in the description below are merely some of the embodiments of the present invention, based on which other drawings may be obtained by those of ordinary skill in the art without any creative effort. In the drawings.

The embodiments of the present invention are illustrated through the above drawings, and will be described in more detail below. These drawings and literary description are not used for limiting the scope of the present invention in any way, but illustrating the concepts of the present invention for those skilled in the art with reference to specific embodiments.

DETAILED DESCRIPTION OF THE EMBODIMENTS

In order to make the objects, technical solutions and advantages of the present invention clearer, the embodiments of the present invention will be further described in detail below in conjunction with the accompanying drawings.

Figure 1:
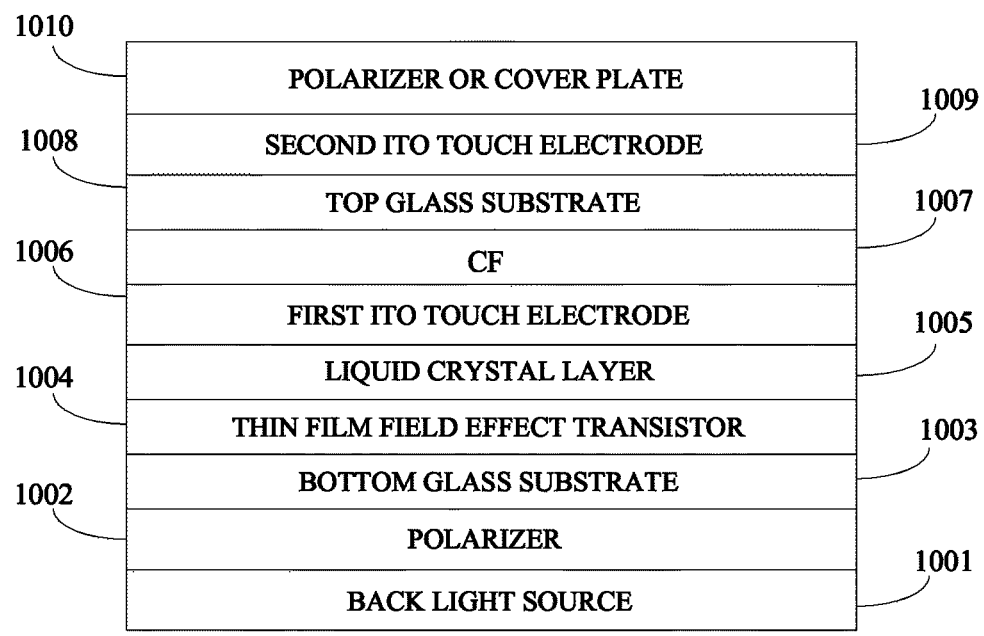
FIG. 1 is a structural schematic diagram of an existing touch screen provided by an embodiment of the present invention.
Figure 2:
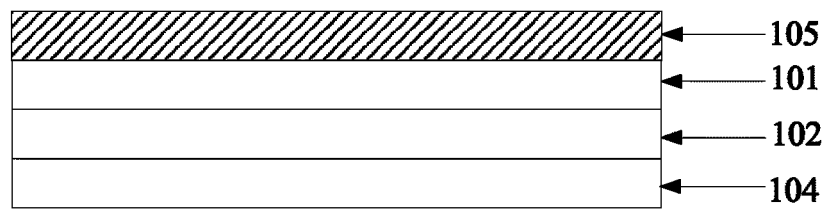
FIG. 2 is a structural schematic diagram of a color filter substrate provided by an embodiment of the present invention.

Referring to FIG. 2, an embodiment of the present invention provides a color filter substrate 100, including: a transparent substrate 101; a color filter layer 102 provided on one side of the transparent substrate 101; a first touch electrode 104 provided on the side, where the color filter layer 102 is located, of the transparent substrate 101, the first touch electrode 104 being made of metal or ashed metal; and a second touch electrode 105 provided on one side of the transparent substrate 101.

For example, the first touch electrode 104 may be a sensing electrode, and the second touch electrode 105 may be a transmission electrode.

For example, the first touch electrode 104 and the second touch electrode 105 may be provided on different sides of the transparent substrate 101, as shown in FIG. 2.

Alternatively, the first touch electrode and the second touch electrode may also be provided on the same side of the transparent substrate (not shown). When the first touch electrode and the second touch electrode are provided on the same side of the transparent substrate, the thickness of the touch screen may be reduced, and thus realizing a thinned effect of the touch screen.

In the color filter substrate provided by the embodiment of the present invention, the color filter layer is provided on one side of the transparent substrate, the first touch electrode made of metal or ashed metal is provided on the side of the transparent substrate where the color filter layer is located, and the second touch electrode is provided on one side of the transparent substrate. The first touch electrode in the color filter substrate is made of metal or ashed metal, so that the impendence of the touch screen is lowered, the thickness of the touch screen are reduced and the cost is lowered.

Figure 3:
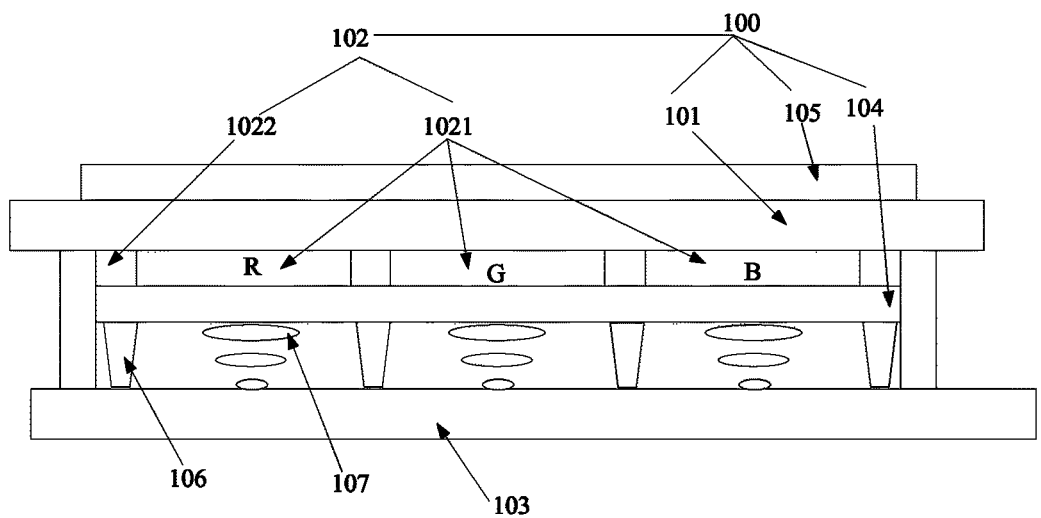
FIG. 3 is a structural schematic diagram of another color filter substrate provided by an embodiment of the present invention.

Referring to FIG. 3, an embodiment of the present invention provides another color filter substrate 100, including: a transparent substrate 101; a color filter layer 102 provided on one side of the transparent substrate 101; a first touch electrode 104 provided on the side, where the color filter layer 102 is located, of the transparent substrate 101, the first touch electrode 104 being made of metal or ashed metal; and a second touch electrode 105 provided on the other side of the transparent substrate 101, the second touch electrode 105 being made of ashed metal. Moreover, the color filter layer 102 includes color pixels 1021 and a black matrix 1022 provided between the adjacent color pixels 1021. In the color filter substrate 100, the first touch electrode 104 is provided on the surface of one side of the color filter layer 102 away from the transparent substrate 101.

Moreover, in the reference signs of FIG. 3, the sign 106 indicates a photo spacer (referred to as PS), the sign 107 indicates liquid crystals, and the sign 103 indicates an array substrate. The color pixels 1021 may include red pixels (R), green pixels (G) and blue pixels (B). In practical application, the color pixels 1021 may also include other color pixels, which are not limited in the present invention.

Figure 4:
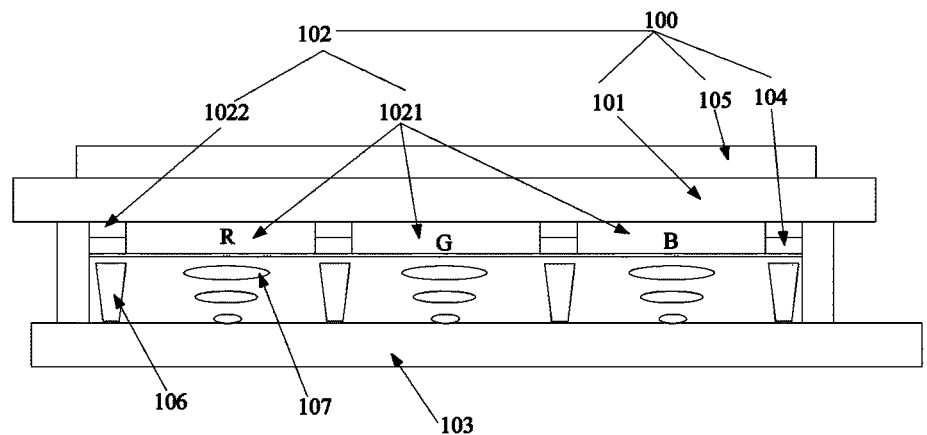
FIG. 4 is a structural schematic diagram of a further color filter substrate provided by an embodiment of the present invention.

Referring to FIG. 4, an embodiment of the present invention provides a further color filter substrate 100, including: a transparent substrate 101; a color filter layer 102 provided on one side of the transparent substrate 101; a first touch electrode 104 provided on the side, where the color filter layer 102 is located, of the transparent substrate 101; and a second touch electrode 105 provided on the other side of the transparent substrate 101. Moreover, the color filter layer 102 includes color pixels 1021 and a black matrix 1022 provided between the adjacent color pixels 1021. In the color filter substrate 100, in order to avoid Moire interference, the projection of the first touch electrode 104 on the transparent substrate 101 is positioned within the projection region of the black matrix 1022 on the transparent substrate 101, and the first touch electrode 104 is provided on the outer surface of the black matrix 1022 and close to the array substrate 103, that is, the first touch electrode 104 is provided on the surface of one side of the black matrix 1022, relatively close to the array substrate 103 but away from the transparent substrate 101.

For example, the first touch electrode 104 may be made of ashed metal, e.g. molybdenum niobium oxynitride. Alternatively, the first touch electrode 104 may also be made of metal, including at least one of copper, molybdenum, aluminum and silver.

In order to further avoid Moire interference, in the color filter substrate 100, the projection of the second touch electrode 105 on the transparent substrate 101 may be positioned within the projection region of the black matrix 1022 on the transparent substrate 101, and the second touch electrode 105 may be made of ashed metal.

By using the first touch electrode and the second touch electrode made of ashed metal, a non-reflective effect can be realized, the display effect and the touch performance of the touch screen can be improved, and meanwhile, the cost can also be lowered. For the structures indicated by other signs in FIG. 4, refer to the description of the signs in FIG. 3.

It should be noted that, the ashed metal may be any material with low reflectivity, e.g. molybdenum niobium oxynitride, and the embodiments of the present invention are not limited thereto.

Figure 5:
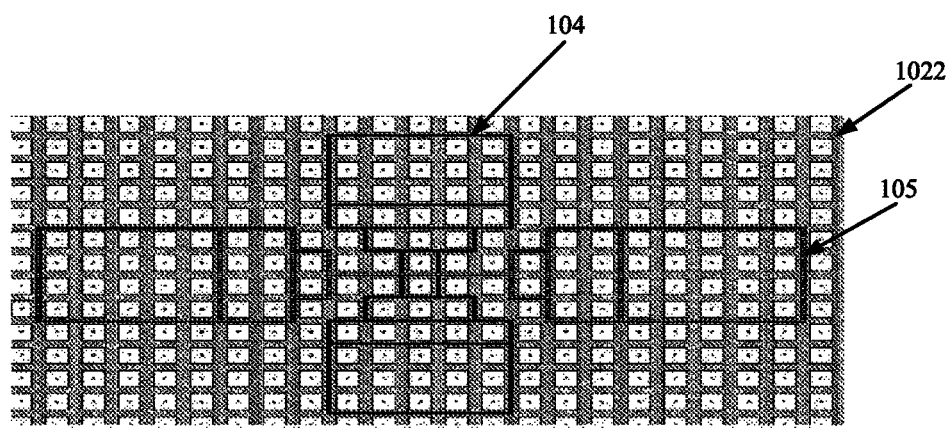
FIG. 5 is a structural schematic diagram of grid line distribution of the first touch electrode and the second touch electrode provided by the embodiments of the present invention.
Figure 6:
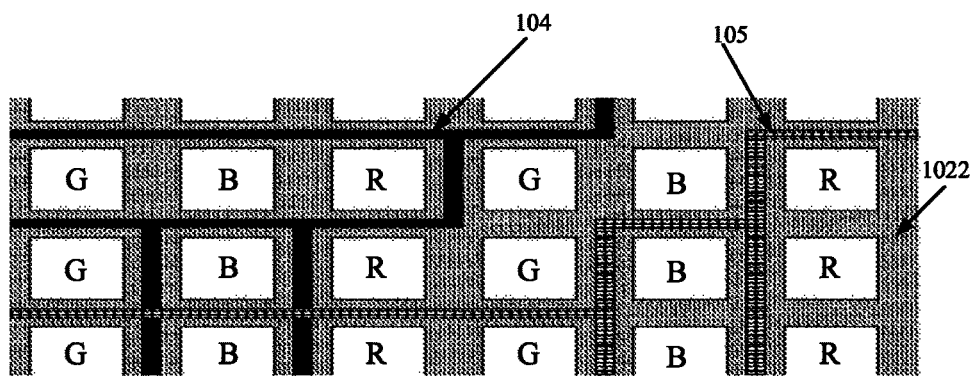
FIG. 6 is a schematic diagram of a partial enlarged structure of grid line distribution of the first touch electrode and the second touch electrode provided by the embodiments of the present invention.

FIG. 5 shows a top view of a schematic diagram of grid distribution of the first touch electrode and the second touch electrode. In the reference signs of FIG. 5, the sign 104 indicates the first touch electrode, the sign 105 indicates the second touch electrode, and the sign 1022 indicates the black matrix. FIG. 6 is a schematic diagram of a partial enlarged structure of FIG. 5. For the structures indicated by the signs of FIG. 6, refer to the description of the signs of FIG. 5.

Figure 7:
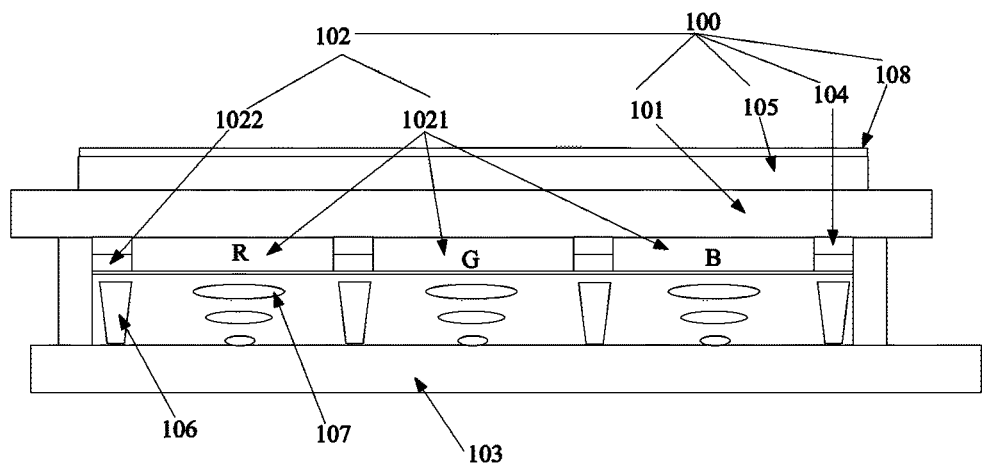
FIG. 7 is a structural schematic diagram of a still further color filter substrate provided by an embodiment of the present invention.

Referring to FIG. 7, an embodiment of the present invention provides a still further color filter substrate 100. In the color filter substrate 100, the first touch electrode 104 may be provided between the transparent substrate 101 and the black matrix 1022, thus reducing the influence of the first touch electrode 104 on the electric field of liquid crystal 107 and improving the touch sensitivity of the touch screen. In order to further avoid Moire interference, the first touch electrode 104 may be made of ashed metal. For the structures indicated by other signs of FIG. 7, refer to the description of the signs of FIG. 4, and will not be redundantly described herein.

Figure 8:
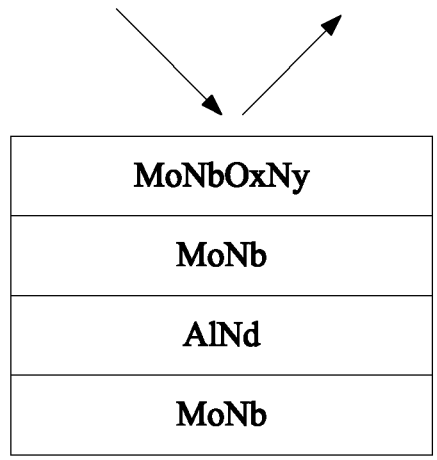
FIG. 8 is a schematic diagram of a structure superposed by a shadow elimination layer provided by the prior art.

As shown in FIG. 7, the color filter substrate 100 may further include a shadow elimination layer 108, which is provided on the outer surface of the second touch electrode 105. It should be noted that, the outer surface of the second touch electrode 105 is a surface of the second touch electrode 105 away from the transparent substrate 101. As shown in FIG. 8, in the existing shadow elimination technology, a pair of molybdenum-niobium (MoNb) layers are added to two sides of common metallic neodymium aluminide (AlNd), and a metallic shadow elimination layer of molybdenum niobium oxynitride (MoNbOxNy) with low reflectivity is formed through a sputtering process, so that the metallic layer (MoNb) with high reflectivity is covered by the metallic shadow elimination layer with low reflectivity, and then the purpose of metallic shadow elimination is fulfilled. In the embodiment of the present invention, the shadow elimination layer 108 is provided on the outer surface of the second touch electrode 105 subjected to an ashing process, and the second touch electrode 105 is just matched with the shadow elimination layer 108, so that Moire interference can be better avoided, the overall reflectivity is less than 20%, and the purposes of ashing the film layers, reducing the reflectivity and making metal circuits invisible to naked eyes are fulfilled.

In the embodiment of the present invention, metal grids are used as the touch electrodes due to their low impedance, the sheet resistance of the metal grids ranges from 5 ohms to 10 ohms, while the impedance of a traditional ITO film layer ranges from 50 ohms to 100 ohms, and the impedance of a thin film touch sensor is about 150 ohms. Moreover, the metal grids can deal with large-sized touch solutions, and can be applied to notebook computers or all-in-one products.

The color filter substrate according to the embodiment of the present invention adopts the metal grid technology of copper or silver material subjected to the ashing process, which is superior to the ITO in display effect and cost. The first touch electrode is made of metal or ashed metal, and the second touch electrode is made of anti-reflective ashed metal, so that the resistance of conductive wires can be reduced, the touch sensitivity is improved, the power consumption is reduced, narrow line width and narrow borders are realized, and the cost of an integrated driving circuit is lowered. By adopting the metal grid technology, the circuit of the first touch electrode is concealed below the black matrix, and the circuit of the second touch electrode is superposed above the black matrix, thus eliminating the influence of Moire interference on display and improving the light transmittance. The metal shadow elimination technology and the metal grid technology are combined and applied to the embedded touch screen technology (it can be understood that the first touch electrode is fabricated on the side of the color filter substrate where the color filter layer is located), thus improving the electrical properties and achieving the effects of ashing the film layers, reducing the reflectivity and making metal circuits invisible to naked eyes. The common metal or ashed metal substituting the ITO that has high impedance, poor toughness and high price facilitates better touch performance and lower cost, and is suitable for large-sized products and reduces the thickness of the touch screen.

To sum up, in the color filter substrate provided by the embodiment of the present invention, the color filter layer is provided on one side of the transparent substrate, the first touch electrode made of metal or ashed metal is provided on the side of the transparent substrate where the color filter layer is located, and the second touch electrode is provided on one side of the transparent substrate. The first touch electrode in the color filter substrate is made of metal or ashed metal, so that the impendence of the touch screen is lowered, the size of the touch screen is reduced and the cost is lowered.

Figure 9:
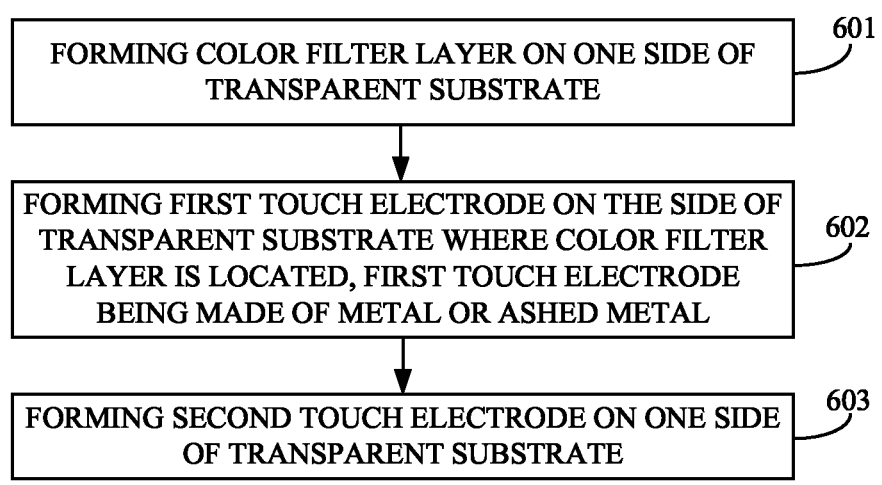
FIG. 9 is a flow diagram of a fabricating method of the color filter substrate provided by an embodiment of the present invention.

An embodiment of the present invention further provides a method for fabricating a color filter substrate, as shown in FIG. 9, the method comprises the following steps 601 to 603.

Step 601 comprises forming a color filter layer on one side of a transparent substrate.

Step 602 comprises forming a first touch electrode on the side, where the color filter layer is located, of the transparent substrate, the first touch electrode being made of metal or ashed metal.

Step 603 comprises forming a second touch electrode on one side of the transparent substrate.

In the method for fabricating the color filter substrate provided by the embodiment of the present invention, the color filter layer is formed on one side of the transparent substrate, the first touch electrode made of metal or ashed metal is formed on the side of the transparent substrate where the color filter layer is located, and the second touch electrode is formed on one side of the transparent substrate. The first touch electrode in the color filter substrate is made of metal or ashed metal, so that the impendence of the touch screen is lowered, the thickness of the touch screen is reduced and the cost is lowered.

Step 603 may comprise forming a second touch electrode on one side of the transparent substrate, so that the second touch electrode and the first touch electrode are positioned on different sides of the transparent substrate.

It should be noted that, the first touch electrode and the second touch electrode may also be provided on the same side of the transparent substrate, so that the size of the touch screen is reduced and a thinned effect of the touch screen is realized.

Further, the color filter layer may include color pixels and a black matrix between the adjacent color pixels.

In order to avoid Moire interference, step 602 may comprise forming a first touch electrode on the side of the transparent substrate where the color filter layer is located, so that the projection of the first touch electrode on the transparent substrate is positioned within the projection region of the black matrix on the transparent substrate. For example, the first touch electrode may be made of ashed metal, e.g. molybdenum niobium oxynitride. Alternatively, the first touch electrode may be made of metal, including at least one of copper, molybdenum, aluminum and silver.

In order to further avoid Moire interference, step 603 may comprise forming a second touch electrode on one side of the transparent substrate, so that the projection of the second touch electrode on the transparent substrate is positioned within the projection region of the black matrix on the transparent substrate. The second touch electrode may be made of ashed metal.

Further, step 602 may comprise forming a first touch electrode on the side of the transparent substrate where the color filter layer is located and between the transparent substrate and the black matrix. The first touch electrode is formed between the transparent substrate and the black matrix, thus reducing the influence of the first touch electrode on the liquid crystal electric field and improving the touch sensitivity of the touch screen.

After step 603, the method for fabricating the color filter substrate may further comprise forming a shadow elimination layer on the outer surface (the surface away from the transparent substrate) of the second touch electrode. The shadow elimination layer is formed on the outer surface of the second touch electrode, so that the overall reflectivity is less than 20%, and the purposes of ashing the film layers, reducing the reflectivity and making metal circuits visible to naked eyes are fulfilled.

To sum up, in the method for fabricating the color filter substrate provided by the embodiment of the present invention, the color filter layer is fabricated on one side of the transparent substrate, the first touch electrode made of metal or ashed metal is formed on the side of the transparent substrate where the color filter layer is located, and the second touch electrode is fabricated on one side of the transparent substrate. The first touch electrode in the color filter substrate is made of metal or ashed metal, so that the impendence of the touch screen is lowered, the size of the touch screen is reduced and the cost is lowered.

It should be noted that, according to the embodiment of the present invention, in the process of fabricating the touch screen, for example, the color filter substrate may be prepared first, and the color filter substrate may include: a transparent substrate; a color filter layer formed on one side of the transparent substrate, the color filter layer including color pixels and a black matrix between the adjacent color pixels; a first touch electrode formed on the side, where the color filter layer is located, of the transparent substrate; a PS and the like; and then the color filter substrate is combined with an array substrate, the combined color filter substrate and array substrate are thinned, and a second touch electrode is formed on the thinned color filter substrate and array substrate, that is, the second touch electrode is formed on the other side of the transparent substrate. Alternatively, for example, the second touch electrode is formed through a patterning process on one side of the transparent substrate on which the structure of the color filter substrate is to be formed, and then the structure of the color filter substrate is formed on the other side of the transparent substrate, wherein the color filter substrate may include: the transparent substrate; a color filter layer formed on the other side of the transparent substrate, the color filter layer including color pixels and a black matrix between the adjacent color pixels; a first touch electrode formed on the side, where the color filter layer is located, of the transparent substrate; a PS and the like; and then the color filter substrate is combined with an array substrate.

It should be noted that, the sequence of the steps in the method for fabricating the color filter substrate in the embodiment of the present invention can be appropriately adjusted, and the steps may also be correspondingly increased or reduced according to the situations. Any skilled one who is familiar with this art could readily think of variation methods within the technical scope disclosed by the present invention, and these variation methods shall be within the protection scope of the present invention and therefore will not be redundantly described.

It could be clearly appreciated by those skilled in the art that for the purposes of convenience and simplicity in description, for the fabricating method described above, refer to the description of the device of the aforementioned embodiments, and will not be redundantly described herein.

To sum up, in the method for fabricating the color filter substrate provided by the embodiment of the present invention, the color filter layer is formed on one side of the transparent substrate, the color filter layer includes color pixels and a black matrix between the adjacent color pixels, the first touch electrode is formed on the side of the transparent substrate where the color filter layer is located, the second touch electrode made of ashed metal is formed on one side of the transparent substrate, and meanwhile, the projections of the first touch electrode and the second touch electrode on the color filter layer may be overlapped with that of the black matrix. The touch electrodes in the color filter substrate are made of metal or ashed metal, so that Moire interference is avoided, the impendence of the touch screen is lowered, the size of the touch screen is reduced and the cost is lowered.

Another embodiment of the present invention provides a touch screen, including the color filter substrate of FIG. 2, 3, 4 or 7.

Another embodiment of the present invention provides a display device, including the touch screen in the above embodiment or the color filter substrate in the above embodiments.

According to the display device provided by the embodiment of the present invention, in the color filter substrate included in the display device, the color filter layer is formed on one side of the transparent substrate, the color filter layer includes color pixels and a black matrix between the adjacent color pixels, the first touch electrode is formed on the side of the transparent substrate where the color filter layer is located, the second touch electrode made of ashed metal is formed on one side of the transparent substrate, and meanwhile, the projections of the first touch electrode and the second touch electrode on the color filter layer may be overlapped with that of the black matrix. The touch electrodes in the color filter substrate are made of metal or ashed metal, so that Moire interference is avoided, the impendence of the touch screen is lowered, the size of the display device is reduced and the cost is lowered.

The description above is merely for describing preferred embodiments of the present invention, which are not used for limiting the present invention. Any modification, equivalent substitution, improvement and the like made within the spirit and principle of the present invention shall fall within the protection scope of the present invention.

What is claimed is:

1. A color filter substrate, comprising:
   a transparent substrate;
   a color filter layer provided on one side of the transparent substrate;
   a first touch electrode provided on the one side of the transparent substrate where the color filter layer is located, the first touch electrode being made of metal or ashed metal;
   a second touch electrode provided on another side of the transparent substrate opposite to the one side, the second touch electrode being made of ashed metal; and
   a shadow elimination layer that is provided on a surface of one side of the second touch electrode away from the transparent substrate,
   wherein the shadow elimination layer is made of a same material as the second touch electrode.

2. The color filter substrate of claim 1, wherein the color filter layer comprises color pixels and a black matrix between the adjacent color pixels, and a projection of the first touch electrode on the transparent substrate is positioned within a projection region of the black matrix on the transparent substrate.

3. The color filter substrate of claim 1, wherein the color filter layer comprises color pixels and a black matrix between the adjacent color pixels, and the first touch electrode is provided on a surface of one side of the black matrix away from the transparent substrate.

4. The color filter substrate of claim 1, wherein the color filter layer comprises color pixels and a black matrix between the adjacent color pixels, and the first touch electrode is provided between the transparent substrate and the black matrix.

5. The color filter substrate of claim 1, wherein the color filter layer comprises color pixels and a black matrix between the adjacent color pixels, and a projection of the second touch electrode on the transparent substrate is positioned within a projection region of the black matrix on the transparent substrate.

6. The color filter substrate of claim 1, wherein the metal comprises at least one of copper, molybdenum, aluminum and silver, and the ashed metal is molybdenum niobium oxynitride.

7. A method for fabricating a color filter substrate, comprising steps of:
   forming a color filter layer on one side of a transparent substrate;
   forming a first touch electrode on the one side of the transparent substrate where the color filter layer is located, the first touch electrode being made of metal or ashed metal;
   forming a second touch electrode on another side of the transparent substrate opposite to the one side, the second touch electrode being made of ashed metal; and
   forming a shadow elimination layer on a surface of one side of the second touch electrode away from the transparent substrate,
   wherein the shadow elimination layer is made of a same material as the second touch electrode.

8. The method of claim 7, wherein the color filter layer comprises color pixels and a black matrix between the adjacent color pixels, and the step of forming a first touch electrode on the side of the transparent substrate where the color filter layer is located comprises:
   forming a first touch electrode so that a projection of the first touch electrode on the transparent substrate is positioned within a projection region of the black matrix on the transparent substrate.

9. The method of claim 7, wherein the color filter layer comprises color pixels and a black matrix between the adjacent color pixels, and the step of forming a first touch electrode on the side of the transparent substrate where the color filter layer is located comprises:
   forming a first touch electrode so that the first touch electrode is provided on a surface of one side of the black matrix away from the transparent substrate.

10. The method of claim 7, wherein the color filter layer comprises color pixels and a black matrix between the adjacent color pixels, and the step of forming a first touch electrode on the side of the transparent substrate where the color filter layer is located comprises:
  forming a first touch electrode so that the first touch electrode is provided between the transparent substrate and the black matrix.

11. The method of claim 7, wherein the color filter layer comprises color pixels and a black matrix between the adjacent color pixels, and the step of forming a second touch electrode on one side of the transparent substrate comprises:
  forming a second touch electrode so that a projection of the second touch electrode on the transparent substrate is positioned within a projection region of the black matrix on the transparent substrate.

12. The method of claim 7, wherein the metal comprises at least one of copper, molybdenum, aluminum and silver, and the ashed metal is molybdenum niobium oxynitride.

13. A touch screen, comprising the color filter substrate of claim 1.

14. A display device, comprising the touch screen of claim 13.

15. The color filter substrate of claim 1, wherein the color filter layer comprises color pixels and a black matrix between adjacent color pixels, a projection of the first touch electrode on the transparent substrate is positioned within a projection region of the black matrix on the transparent substrate; and a projection of the second touch electrode on the transparent substrate is positioned within the projection region of the black matrix on the transparent substrate.

\* \* \* \* \*